(12) United States Patent
Pickering et al.

(10) Patent No.: US 8,494,150 B2
(45) Date of Patent: Jul. 23, 2013

(54) COMPUTER-TELEPHONY INTEGRATION IN A SERVICE PROVIDER ENVIRONMENT

(75) Inventors: Richard Pickering, Torquay (GB); Ashley Unitt, Basingstoke (GB)

(73) Assignee: New Voice Media, Ltd., Hampshire (GB)

( * ) Notice: Subject to any disclaimer, the term of this patent is extended or adjusted under 35 U.S.C. 154(b) by 130 days.

(21) Appl. No.: 13/056,761

(22) PCT Filed: Sep. 10, 2009

(86) PCT No.: PCT/GB2009/002171
§ 371 (c)(1),
(2), (4) Date: Apr. 15, 2011

(87) PCT Pub. No.: WO2010/029301
PCT Pub. Date: Mar. 18, 2010

(65) Prior Publication Data
US 2011/0188648 A1    Aug. 4, 2011

(30) Foreign Application Priority Data

Sep. 11, 2008   (GB) .................................. 0816654.8

(51) Int. Cl.
*H04M 3/00* (2006.01)
*H04M 5/00* (2006.01)

(52) U.S. Cl.
USPC ............ 379/265.11; 379/211.02; 379/265.01; 379/265.05

(58) Field of Classification Search
USPC ............. 379/211.02, 265.01, 265.11, 265.05, 379/88.01; 709/204
See application file for complete search history.

(56) References Cited

U.S. PATENT DOCUMENTS

| | | | |
|---|---|---|---|
| 6,681,010 B1 * | 1/2004 | Anderson et al. | 379/265.11 |
| 8,254,555 B1 * | 8/2012 | Noble, Jr. | 379/265.01 |
| 2002/0032730 A1 * | 3/2002 | Amit et al. | 709/204 |
| 2004/0125939 A1 | 7/2004 | Drobek | |
| 2008/0205624 A1 | 8/2008 | Mandalia et al. | |

FOREIGN PATENT DOCUMENTS

| | | |
|---|---|---|
| EP | 1396990 A1 | 3/2004 |
| GB | 2439363 B | 6/2008 |
| WO | 97/38519 A | 10/1997 |
| WO | 99/17517 A | 8/1999 |

* cited by examiner

*Primary Examiner* — Thjuan K Addy
(74) *Attorney, Agent, or Firm* — Brian R. Galvin; Galvin Patent Law LLC

(57) ABSTRACT

One embodiment of the present invention provides a method and system for handling a telephone call. The method comprises receiving an incoming call at a computer-telephony server located as service provider equipment within a telephone network, followed by setting up a call from the computer-telephony server to a customer location. The customer location has a plurality of agents, each agent having an associated computer workstation. The call is forwarded at the customer location to a receiving agent selected from the plurality of agents. There is now communication between the computer-telephony server and one or more of the agents to allow the computer-telephony server to identify the receiving agent. The computer telephony server uses voice analytics on speech input from the receiving agent to identify the receiving agent.

20 Claims, 6 Drawing Sheets

COMPUTER-TELEPHONY INTEGRATION IN A SERVICE PROVIDER ENVIRONMENT

FIELD OF THE INVENTION

The invention relates to a method and apparatus for handling a telephone call, and in particular providing computer-telephony integration in a service provider equipment environment for handling the call.

BACKGROUND OF THE INVENTION

FIG. 1 is an illustration of a conventional computer-telephony integration (CTI) system using customer premises equipment (CPE). Note that FIG. 1 depicts computer links in solid lines, and telephony links in broken lines.

The system of FIG. 1 receives an incoming call 60 from telephone network 101 at switch 90. The switch passes information about the call to a CTI server 80. The information passed may include, for example, the calling line identification (CLID), sometimes known as automatic number identification (ANI), and/or the dialed number identification.

Switch 90 may also be provided with an interactive voice response (IVR) unit 95, which may be used to obtain additional information from the caller, for example an account number or such like. This additional information may also be passed to CTI server 80. The IVR unit may be further used to play various messages to the caller as part of the initial call handling, for example to allow a caller to specify the type of desired action—e.g. make a new booking, amend a previous booking, or some other query. Caller input in response to such messages can then be used subsequently in determining how to handle the call.

The switch 90 routes the incoming call 60 over an internal telephone network (not specifically shown in FIG. 1) to a telephone 121 belonging to an agent 120. For example, the switch may route a particular incoming call 60 to agent 120B having telephone 121B. The CTI server 80 may instruct the switch 90 which particular agent to forward the incoming call to. In other implementations, the switch 90 may make this decision through some other mechanism, such as agent availability (and notify the CTI server 80 accordingly).

In addition to telephone 121, each agent 120 is also provided with a workstation 122. The CTI server 80 has access to a customer relationship management (CRM) database 70. The CTI server 80 can use information about a particular call provided by switch 90 to look up information relating to the caller in the CRM database 70. For example, this information may represent the name and address of a party associated with a particular calling line identification, as well as any information about previous orders this person may have made, etc.

The CTI server 80 now provides this information to the workstation 122 associated with the agent 120 who receives the call from switch 90. For example if the incoming call 60 is to be routed to telephone 121 B of agent 120B, then the CTI server accesses information about the caller from CRM database 70 and forwards this information to corresponding workstation 122B. Another possibility is that the CTI server provides the corresponding workstation with a link that allows the workstation itself to retrieve relevant information from CRM database 70. This information received by workstation 122 can be used to assist the agent in handling the call, such as for performing a transaction with the caller.

(In the present context, the term transaction is used broadly to indicate an interaction between the caller and the agent, with or without payment being involved, such as providing information or selling a product to a caller, initiating, modifying or terminating a service provided to the caller, etc. A transaction will generally be entered into and/or facilitated by workstation 122).

Call centres having CTI such as shown in FIG. 1 have been around for many years. The configuration shown in FIG. 1 is often internal to a particular organisation. However, it is also common for organisations to outsource CTI and/or call centre operations to some third party, potentially the operator of telephone network 101. In some cases, the party running an outsourced call centre may operate their own CPE environment, such as shown in FIG. 1.

Another configuration is based on service provider equipment (SPE), which is located (in a logical sense) inside the telephone network itself, rather than at a particular customer location. One advantage of the SPE approach is that an SPE installation is very flexible in the way it can serve multiple customers. However, it can be difficult to provide fully effective CTI in an SPE environment, given the need to integrate operations in the network with those at the customer location.

SUMMARY OF THE INVENTION

One embodiment of the invention provides a method of handling a telephone call. The method comprises receiving an incoming call at a computer-telephony server located as service provider equipment within a telephone network. The method further comprises setting up a call from the computer-telephony server to a customer location. The customer location has a plurality of agents, each agent having an associated computer workstation and telephone extension. The method further comprises forwarding the call at the customer location to the telephone extension of a receiving agent selected from the plurality of agents. The method further comprises communicating between the computer-telephony server and one or more of the plurality of agents to allow the computer-telephony server to identify the receiving agent.

Such an approach allows agents at the customer location and various applications to utilise CTI information for handling the incoming call, despite the fact that the computer-telephony server is not directly responsible for allocating the call to a particular agent (and is not directly informed of the agent to which the allocation has been made).

The computer-telephony server can use knowledge of the identity of the receiving agent to determine further handling of the call while the call is in progress. Such further handling may take many different forms, for example, sending computer-telephony information by the computer-telephony server to the computer workstation associated with the identified receiving agent over a computer network. The receiving agent can then use the CTI information to assist in their further interaction with the caller.

Other ways for making real-time use of the identity of the receiving agent include performing voice analytics, such as speech recognition and/or speaker verification, on the telephone call and then using the results from this analysis to control or impact a transaction associated with the telephone call.

The computer-telephony server may also use knowledge of the identity of the receiving agent in performing further processing relating to the call after the call has terminated. One way of doing this is, for example, to analyse call statistics for various agents (such as the number and durations of the different calls). Another way is to use a recording of the call to resolve any subsequent disputes arising from a transaction entered into a workstation by an agent during the call. The skilled person will be aware of many further possible CTI applications that can benefit from being able to identify the agent handling a particular call (both during and/or after the call).

In one embodiment, the call is forwarded at the customer location to the telephone extension of a receiving agent using an automatic call distribution (ACD) unit. The ACD does not directly provide the computer-telephony server with information about the allocations of call. (It is possible to provide such information in more complicated configurations involving a data link between the ACD and the computer-telephony server, but this increases the complexity and overall costs of the system).

In one embodiment, the method further comprises the agent registering with the computer-telephony server prior to receiving the call. Such registration generally allows the computer-telephony server to determine which computer workstation is associated with which telephone extension. Therefore, the computer-telephony server only needs to identify the telephone extension to which the call has been forwarded in order to know the associated computer workstation. The registering may further record an agent identifier for the agent associated with a given telephone extension and computer workstation. This registration information can be used by the computer-telephony server to help monitor and control the handling of calls at the customer location.

In one embodiment, the communicating comprises the receiving agent sending a reference number to the computer-telephony server over the telephone network. The reference number may identify, for example, the telephone extension of the receiving agent, the computer workstation of the receiving agent, and/or the agent identifier of the receiving agent. The computer-telephony server can use this reference information to determine which agent is handling which incoming call.

In one embodiment, the reference number is entered via pressing a single programmable key on the agent telephone. This is particularly convenient if the reference number used from a given telephone is normally constant (so that the key does not need frequent re-programming). This will often be the case if the reference number corresponds to the telephone extension number.

In one embodiment, the method further comprises providing a prompt to the receiving agent to send the reference number. The prompt may be played to the receiving agent over the telephone network, if possible in a manner so that the prompt is inaudible to the caller. This can be accomplished for example by starting with two separate calls: one from the caller to the computer-telephony server, and one from the computer-telephony server to the customer location. The prompt is then only played (and therefore is only audible) on the second of these calls. The two calls can then be bridged or joined to complete the connection between the caller and the agent.

In one embodiment, the prompt is provided by a script or application running on the computer workstation of the receiving agent. The agent may activate the script or application in response to receiving a new incoming call.

In one embodiment, the method further comprises providing a call identifier to the receiving agent over the telephone network. For example, the call identifier may be played to the receiving agent over the telephone network. This may be done inaudibly to the caller (e.g. using the two call approach described above). The call identifier may comprise a reference number generated by the computer-telephony server.

In another embodiment, the call identifier is supplied to a screen of a telephone associated with the receiving agent. The call identifier may be based at least in part on the calling line identification (CLID). Note that many existing telephone systems include a screen for CLID display. One possibility is for the CLID from the incoming call to be modified by the computer-telephony server. Such modification might be employed, for example, to change the CLID into some other form of call reference generated by the computer-telephony server.

In one embodiment, the method further comprises the receiving agent transmitting the call identifier to the computer-telephony server using the workstation associated with the receiving agent. This then allows the computer-telephony server to associate the call specified by the call identifier with the computer workstation that transmitted the call identifier.

In one embodiment, the method further comprises the computer-telephony server supplying the workstation associated with the receiving agent with a call listing. The listing contains information for all calls undergoing agent allocation (plus maybe information for other calls as well). The call listing may be supplied by the computer-telephony server to all of the computer workstations. Alternatively, the call listing may be supplied by the computer-telephony server to a workstation in response to a specific request from the workstation. (The receiving agent could send such a request as part of receiving the new call).

In one embodiment, the listing includes at least information identifying each call plus CTI information for each call. The CTI information may comprise a link for use in downloading further information about the corresponding call. Activation of the link may be routed via the computer-telephony server (with subsequent re-direction) to allow the computer-telephony server to update its records about the allocation of the corresponding call.

In one embodiment, the communicating involves an agent who receives a call providing an input to the computer-telephony server using their associated computer workstation. For example, for each new call, the agent may click a button on their computer workstation. This button sends a notification of the new call to the computer-telephony server, which can then use the timing of this workstation input in comparison with timing of the call (as already known by the computer-telephony server) to identify the receiving agent. If multiple incoming calls are received too close together for the calls to be distinguished on the basis of timing alone, the computer-telephony server may use some additional form of agent communication (such as voice analytics on speech input from the receiving agent) to identify the receiving agent.

In one embodiment, the computer telephony server uses voice analytics on speech input from the receiving agent to identify the receiving agent. The voice analytics may comprise speaker recognition and/or speech recognition performed on said speech input. The voice analytics system may have separate components for performing the speaker recognition and the speech recognition. It will be appreciated that using both of these techniques together can produce a more reliable identification of the receiving agent.

Identification of the agent is assisted because there is only a limited set of possibilities. For example, for speaker recognition, the voice analytics system only has to choose between a restricted set of agents, such as just those agents known to be currently logged onto the computer telephony system. Likewise, the speech to be recognised by the voice analytics system will generally correspond to some predetermined wording for identifying an agent, such as the name or telephone extension number of the receiving agent, or some other reference identifier assigned to the agent. It is easier to perform speech recognition on a predetermined finite vocabulary than on general speech.

In some embodiments, the agent receives a prompt or instruction to provide the speech input. There are various ways in which this prompt can be provided to the agent. One option is for the agent to initiate a script or application on their computer workstation whenever they receive a new call, and the prompt could be provided by this script as part of processing the new call.

Another option is for the computer-telephony server to provide the prompt as an audio message to the receiving agent over the telephone network. This prompt may be provided to the agent prior to connecting the caller to the agent so that the prompt is inaudible to the caller. Likewise, the speech input from the agent may be received prior to connecting the caller to the agent so that again this portion of the call handling is inaudible to the caller. The computer-telephony server then connects the caller to the agent in response to identifying the receiving agent using the speech input.

In another embodiment, the speech input is received after connecting the caller to the agent by eavesdropping on the conversation between the caller and the agent. This embodiment may use speaker recognition on spoken remarks from the agent to the caller in order to identify the agent. The agent may be prompted by their computer workstation (and/or trained) to introduce themselves by name to the caller at the start of the call. The voice analytics system can then perform speech recognition on this particular portion of speech to identify the agent. This embodiment avoids any delay in connecting the caller to an agent, although any CTI information specific to the caller may not be available for the agent until after the computer-telephony server has identified the receiving agent for the call.

Another embodiment of the invention provides a system for handling telephone calls. The system comprises a computer-telephony server for use as service provider equipment within a telephone network for receiving an incoming call and for setting up a call from the computer-telephony server to a customer location. The customer location has a plurality of agents, each agent having an associated computer workstation and telephone extension. The call is forwarded at the customer location to the telephone extension of a receiving agent selected from the plurality of agents. The computer-telephony server is operable to communicate with one or more of the agents to allow the computer-telephony server to identify the receiving agent.

Such a system may be implemented, for example, by suitable programming of a computer system, and/or by the use (at least in part) of special-purpose hardware. The system may benefit from the same particular features as described above in relation to the corresponding method of the invention.

Another embodiment of the invention provides a computer program product for implementing each of the methods described. The computer program product may comprise a set of instruction for execution by a system for download over a computer network. The computer program product may also comprise a set of instructions stored on a medium such as a hard disk, CD ROM, DVD, or flash memory.

The present invention can be considered as providing a form of universal computer-telephony integration, in that it supports CTI functionality in an SPE environment that has hitherto largely been restricted to availability in a CPE environment. Furthermore, this functionality is provided without requiring any direct control linkage between the computer-telephony server and a call distribution device at the receiving end. This provides a powerful, flexible, and cost-efficient architecture for CTI functionality, allowing all call handling systems to benefit from such functionality.

BRIEF DESCRIPTION OF THE DRAWINGS

Various embodiments of the invention will now be described in detail by way of example only with reference to the following drawings.

DETAILED DESCRIPTION

Figure 1:
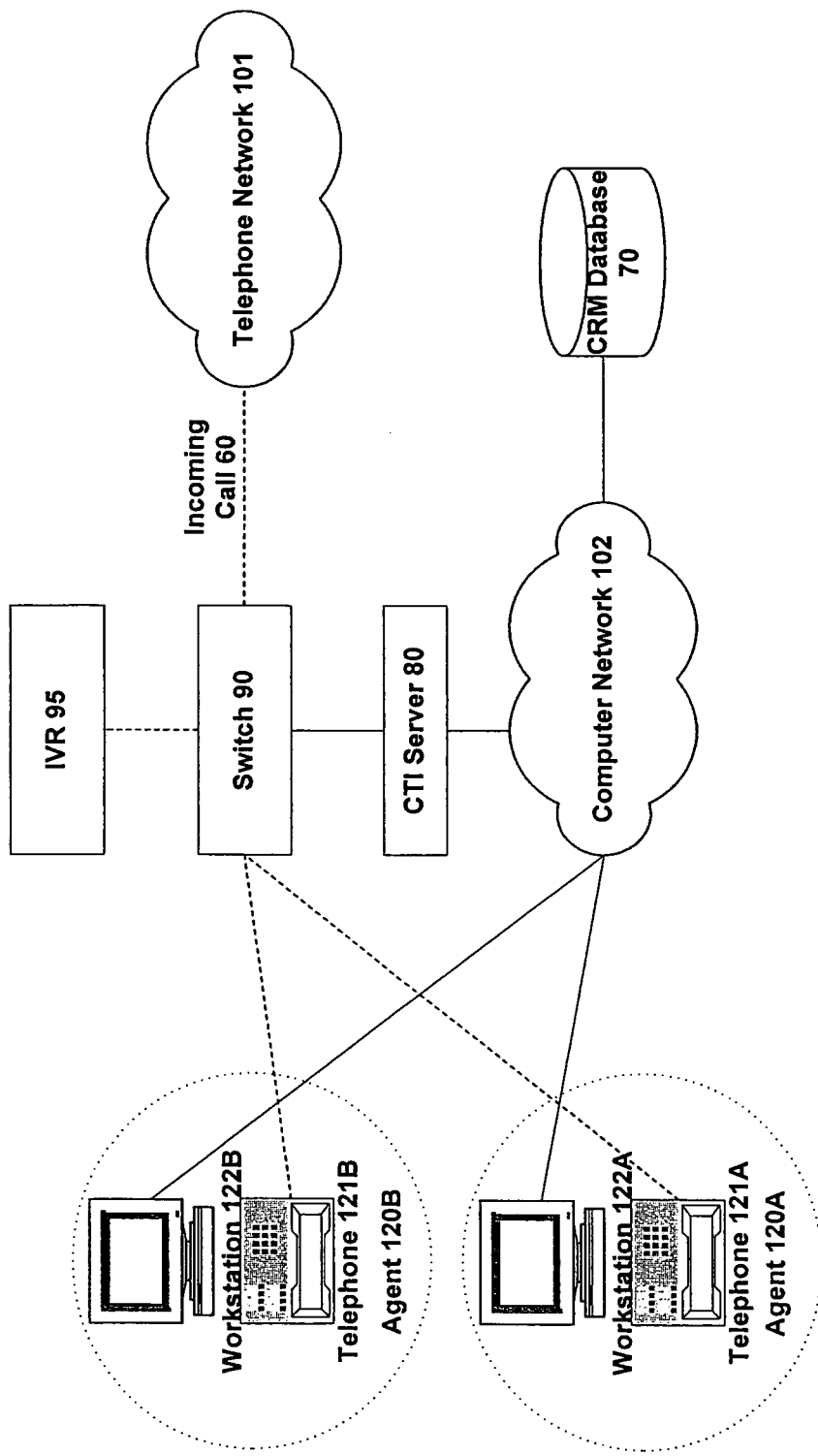
FIG. 1 is a schematic diagram of a known CTI system based on a CPE environment.
Figure 2:
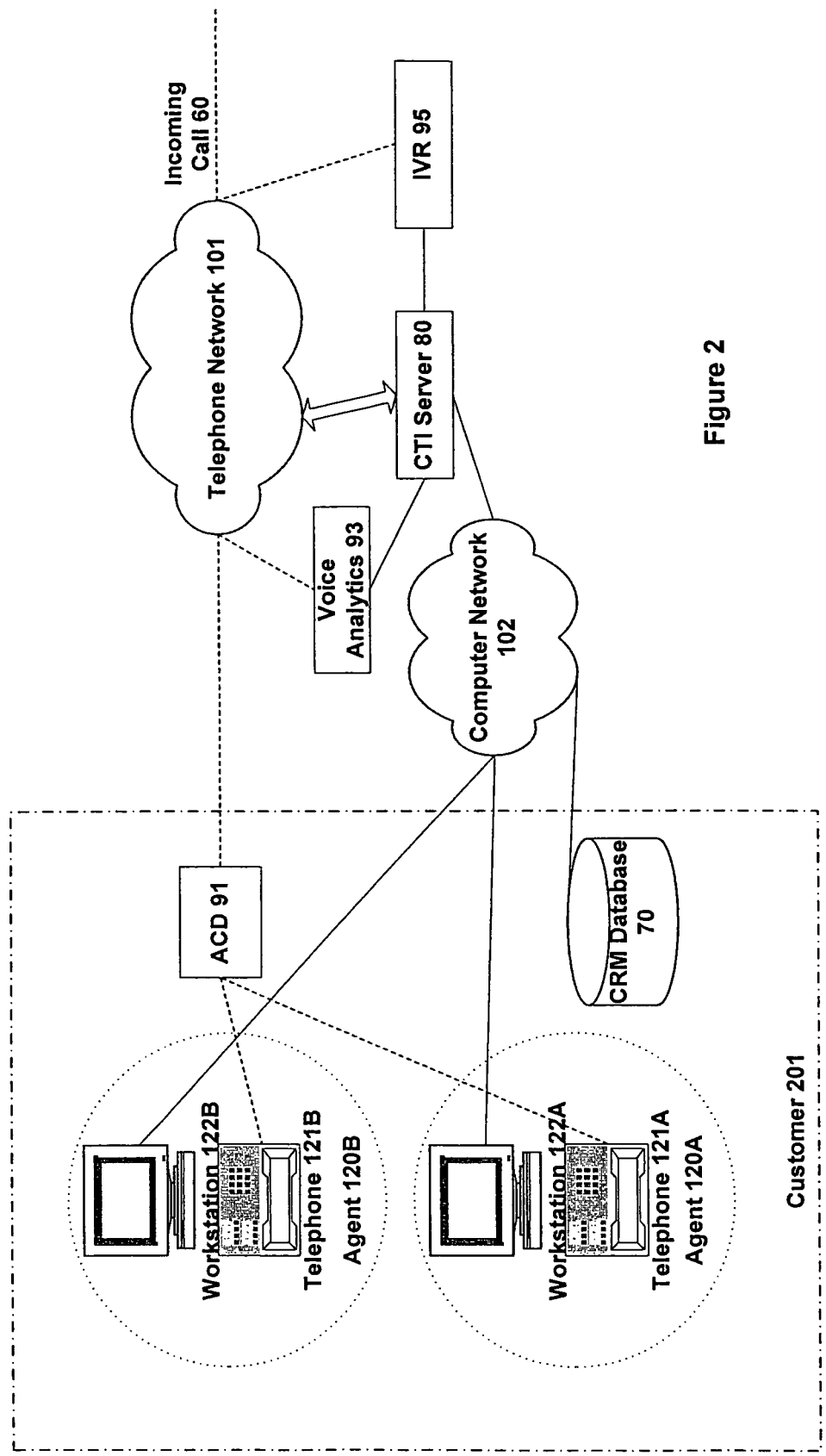
FIG. 2 is a schematic diagram of a CTI system in accordance with one embodiment of the invention based on an SPE environment.

FIG. 2 is an illustration of a CTI system in accordance with one embodiment of the invention. Components that are the same as existing systems such as shown in FIG. 1 will not be described further. In the system of FIG. 2, the CTI system is based on an SPE environment. The service provider usually has a number of customers 201 (only one is shown in FIG. 2), which are generally businesses or other organisations. The service provider operates CTI server 80, which in effect operates as part of telephone network 101, to handle incoming telephone calls for customer 201 from other parties, such as suppliers or clients of customer 201.

The link between CTI server 80 and telephone network 101 in FIG. 2 is shown as a double arrow, rather than specifically as a computer or telephone connection. This is because CTI server 80 may have both computer and telephony connectivity to telephone network 101 (this may or may not be implemented using a single integrated link). For example, CTI server 80 may receive computerised information about an incoming call 60 from telephone network 101, as well as sending computerised instructions to telephone network on how to handle the call. In addition, CTI server 80 may monitor the audio signals on the call, possibly in conjunction with IVR 95.

In the configuration of FIG. 2, an incoming call 60 for customer 201 is passed through telephone network 101. CTI server 80 is assigned responsibility for handling the incoming call 60, typically based on the dialed number of the call corresponding to customer 201.

The CTI server 80 may obtain various information about the call, both directly from telephone network 101, such as the calling line identification, and also (if so desired), by using interactive voice response unit 95. The CTI server 80 may use this call information to obtain further information about the calling party (the client of customer 201), from CRM database 70 over computer network 102. Note that CRM database 70 may be sited at the customer location (as shown in FIG. 2) or at some other location, for example adjacent to CTI server 80. One possible architecture for CRM database 70 is disclosed in PCT/GB2007/003728, which has the same applicant as the present application, and is incorporated herein by reference.

The information obtained by CTI server 80 is used in further handling of the incoming call 60. For example, it may be used in determining where to route the call (especially if customer 201 has multiple sites or offices), whether to play the caller a particular message using IVR 95, and so on. CTI server 80 can route the call by setting up a new call from telephone network 101 to a desired destination (say customer 201). CTI server 80 may then bridge or join the new call to existing call 60 to complete the connection.

The CTI system of FIG. 2 is also provided with a voice analytics system 93 which can be used to perform speech recognition and/or speaker verification with respect to audio signals on telephone network 101. Although voice analytics system 93 is shown as a single unit in FIG. 2, it may have separate components for speech recognition and speaker recognition if both of these functions are implemented.

In some circumstances the voice analytics system may represent the endpoint of the call (if only on a temporary basis). For example, rather than directing an incoming call to IVR 95 to collect information, the CTI server might direct the incoming call 60 instead to the voice analytics system 93. This allows the system to collect caller information using input speech from the call (rather than just touch-tones as for IVR 95).

In other circumstances, voice analytics system 93 may be used in effect to listen in (eavesdrop) on a telephone call between two parties, for example a caller speaking with an agent 120. In this situation, the presence (or otherwise) of the voice analytics system 93 is normally transparent to the parties taking part in the call.

In some configurations, the CTI server 80 may form a bridge for a call between a caller and an agent. In this case there are really two calls, the first from the caller to the CTI server 80 and the second from the CTI server to the agent (although this structure is transparent to the parties on the call). In this configuration, it is possible for the voice analytics system 93 to selectively monitor what the caller is saying (as per the first call) or what the agent is saying (as per the second call).

As shown in FIG. 2, the customer location includes an automatic call distribution (ACD) unit 91. When incoming call 60 is forwarded by CTI server 80 to customer 201, the call is initially received by ACD unit 91. The ACD unit 91 then directs the call to the telephone 121 of a suitable agent 120. This call routing by the ACD 91 may be performed on the basis of any appropriate algorithm, for example first available agent, or least recently active agent if multiple agents are currently available.

One difficulty in the configuration of FIG. 2 is that the ACD unit 91 is not linked to the CTI server 80 to inform the CTI server 80 of the target destination for a given call. Therefore, it is difficult for CTI server 80 to address call-specific information, such as might be retrieved from CRM database 70, to the workstation 122 of the agent 120 handling the call, since the CTI server does not know which particular agent this is.

Figure 3:
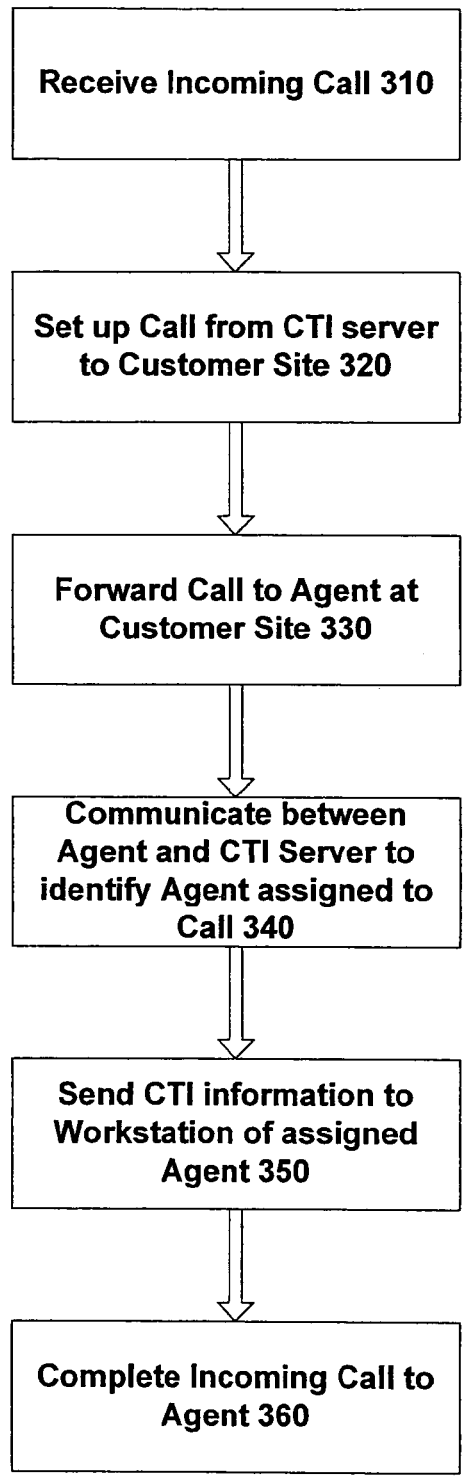
FIG. 3 is a flowchart of a method for operating the CTI system of FIG. 2 in accordance with one embodiment of the invention.

FIG. 3 is a flowchart showing in schematic form the operation of the computer-telephony system of FIG. 2 in accordance with one embodiment of the invention. In particular, the processing of FIG. 3 supports full computer-telephony integration in the embodiment of FIG. 2, whereby an agent 120 who receives an incoming call on his/her telephone 121 is also provided with computer information associated with the call on his/her workstation 122.

The processing of FIG. 3 commences with receipt of an incoming call into the network 310. This call is passed to the CTI server 80 for handling. The CTI server sets up a call to the customer location 320 (after any appropriate intermediate processing, for example using IVR 95). The customer location has multiple agents for receiving calls. Note that these agents do not necessarily all have to be at the same geographical (physical) location. However, calls directed to a particular customer network location may be allocated to any such agent.

The incoming call arriving at the customer location is now forwarded to a selected customer agent 330. This selection and forwarding is accomplished in the embodiment of FIG. 2 using ACD unit 91. Note that ACD unit 91 is not able to tell the CTI server 80 directly the agent to which a particular call has been forwarded (since ACD 91 and CTI server 80 do not support or are not configured for such data exchange).

There is now a communication between the CTI server 80 and at least one of the agents in order to identify the particular agent who has received the call 340. In general the communication will occur (at least in part) between the CTI server 80 and all agents, or just between the CTI server 80 and the agent who has received the telephone call. The communication may be performed over telephone network 101 and/or over computer network 102. This communication may be performed in various ways, as described in more detail below.

CTI information associated with the incoming call is now sent by the CTI server 80 to the workstation 122 of the agent who receives the call 350. This can be achieved via any suitable mechanism, such as using a screen pop. The information may be based, for example, on data retrieved from CRM database 70, such as details of previous orders from the caller. In some cases, the information sent by the CTI server may comprise one or more links to further data, which can then be retrieved from workstation 122 by selecting the desired link (potentially without further involvement of CTI server 80). The receiving agent can use the supplied information or data to assist in handling the call, such as by providing information on the status of a particular order.

The flowchart of FIG. 3 also depicts completion of the incoming call to the agent 360. (Completion here implies that the call is now fully set up, not that the call itself has concluded). This call completion may involve bridging or joining two calls, the first into the CTI server 80 from the original caller, and the second from the CTI server 80 to the selected agent. It will be appreciated that this connection of the two calls will normally be transparent to the caller. Furthermore, the timing of this connection may vary from one embodiment to another. FIG. 3 shows the connection occurring after the agent has been provided with the relevant CTI information, so that they are ready to speak to the caller when the connection is made. This also offers increased opportunities for hiding from the caller any communication between the CTI server and the agent who receives the call. In other embodiments however, the completion of the incoming call through to the agent may occur at an earlier stage, for example as part of forwarding the call to the agent at the customer site at operation 330, or at least before sending part or all of the CTI information to the workstation of the assigned agent.

The approach of FIG. 3 allows full computer telephony-integration, in that an agent receives both the telephone call and also computer information about the call, despite the CTI server being located in an SPE environment, and operating separately from the ACD unit 91 at the customer location 201. This facility greatly enhances the ability to provide computer-telephony integration for SPE configurations.

Figure 4:
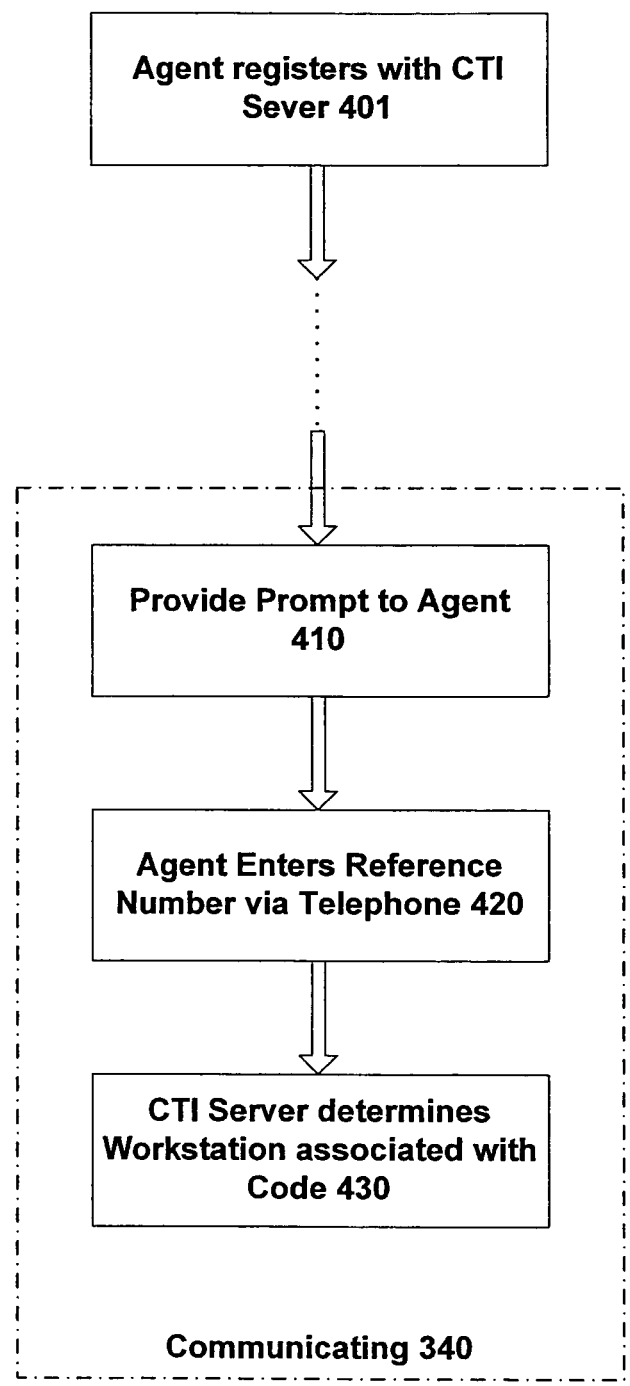
FIG. 4 is a flowchart illustrating a detail from the method of FIG. 3 in accordance with one embodiment of the invention.

FIG. 4 is a diagram illustrating certain aspects of operating the CTI system of FIG. 2 in accordance with one embodiment of the invention. Processing starts when an agent signs on, which includes registering with the CTI server 401. The registration allows the CTI server to record (and hence determine in the future) which telephone 121, as indicated by an extension number or such-like, is associated with which computer workstation 122, as indicated by an IP address or such-like, and vice versa. A computer workstation 122 is associated with a telephone 121 if both are used by the same agent 120.

In some cases the registration procedure may further involve entering a reference identifier for the particular agent. This leads to a registered triplet of information specifying agent, telephone and workstation, whereby specifying any one component of the triplet, such as telephone extension number, allows the other components of the triplet to be accessed and determined.

The registration information must be updated whenever the association between a computer workstation and a telephone is altered. Note that such alteration may arise not only when a computer workstation or telephone is physically moved, but also (and potentially more commonly) when a given computer workstation or telephone has been allocated a new identifier, e.g. a new IP address in a dynamic addressing environment. If the agent identifier is also registered, this is updated whenever the agent moves to a different workstation/telephone (or a new agent signs onto a workstation/telephone that has previously been used by a different agent).

In some cases, there may be a static association between computer workstation (address) and telephone (extension), in which case the registration information only needs to be updated when specific changes are made to the static configuration. More usually, with dynamic addressing, the registration information is entered (updated) at the start of each day as part of the signing-on (logging-on) procedure for the agent. In other embodiments, the registration process might be performed at the start of each work session or work shift—e.g. every morning and afternoon.

One advantage of a log-on procedure is that it allows the CTI server 80 to know those agents who are currently active in receiving calls. This can assist in the agent identification procedure by narrowing down the set of possibilities, since the CTI server already knows that those agents who are not logged on cannot have received the call.

In one embodiment, the registration is accomplished by CTI server 80 providing a screen (such as through a web page) to each computer workstation. An agent enters his/her telephone extension number into this web page, which is then returned (saved back) to CTI server 80. This information allows the CTI server 80 to link the specified telephone extension with the computer workstation from which information was received.

In another embodiment, registration is accomplished by an agent requesting a registration reference number from the CTI server 80 using the computer workstation for the request. The agent then returns this registration reference number to the CTI server over telephone network 101. One way of doing this would be to call one of a set of numbers that map to the CTI server, where the particular number utilised includes the reference number provided to the agent (say as the last 3 digits). Another possibility is for the agent to call a single fixed number (again mapping to CTI server 80), and then to enter the reference number using DTMF tones (which can then be interpreted by IVR 95). In this approach, the CTI server 80 knows the telephone extension from which the call is received, and can then associate this telephone extension with the computer workstation to which the corresponding registration reference number was supplied.

If an agent identifier is recorded, this could be entered via the telephone line (e.g. using DTMF keys) or via an on-line registration procedure using the computer workstation. Note that most call centres do record agent identifiers, for example for general performance monitoring.

As discussed above, the processing of operation 401 may occur only once per session or once per day. In contrast, the remaining operations of FIG. 4 are generally performed for each incoming call, and correspond to the communicating operation 340 of FIG. 3. In particular, after the CTI server 80 has forwarded the call to the customer location, and the call has been answered by an agent, a prompt is provided to the agent 410.

In one embodiment, the prompt is provided by the CTI server 80 over the telephone network 101, for example using IVR 95. It can be arranged that the prompt is heard by the agent 120 at the customer location but is not audible by the original caller (responsible for incoming call 60). One way for achieving this is to maintain two separate calls, the first the original incoming call 60 which terminates at the CTI server 80, and the second the call from the CTI server 80 through to the ACD unit 91 and selected agent. Thus the prompt is played on the second call, but is not audible to the caller on the first call. (The CTI server may ultimately connect the first and second calls together, as per operation 360 of FIG. 3).

The prompt can instruct the agent to enter a reference number into the telephone, for example by pressing the relevant DTMF keys 420. In one embodiment, the entered reference number may correspond to the telephone extension for that agent; another option would be for the reference number to correspond either to the computer registration reference number or to the agent identifier, both as provided at operation 401 (as discussed above).

The CTI server 80 receives the entered reference number as a DTMF signal, e.g. using IVR 95, and uses the reference number provided to identify the agent handling that particular call 430 (via the stored registration information). The CTI server is now able to send the CTI information for the call to the identified agent (as per operation 350 in FIG. 3).

In some cases, a single (function) key on the telephone key pad can be programmed to correspond to the reference number to be entered at operation 420. In other words, pressing this single key causes the telephone to input a sequence of DTMF tones corresponding to the reference number over the telephone line. Note that this programming is particularly suited to providing the extension number of the telephone, since in general the extension number of a given telephone number will be constant—i.e. it won't change at each registration.

Note that in some cases, the prompt to enter the reference number may be provided to the agent on the screen of computer workstation 122 rather than over the telephone network. For example, computer workstation 122 can be provided with a script or application (which may run either locally or over a network, such as a web application), where the agent clicks on a box or performs some similar such action following receipt of a new call (at operation 330 in FIG. 3). In response to this action, the application on workstation 122 can then instruct the agent to enter his or her reference number using DTMF keys, as per operation 420 discussed above. Another possibility is that the prompt of operation 410 is omitted altogether, for example because the agent training covers the immediate provision of the reference number in response to any incoming call.

Figure 4A:
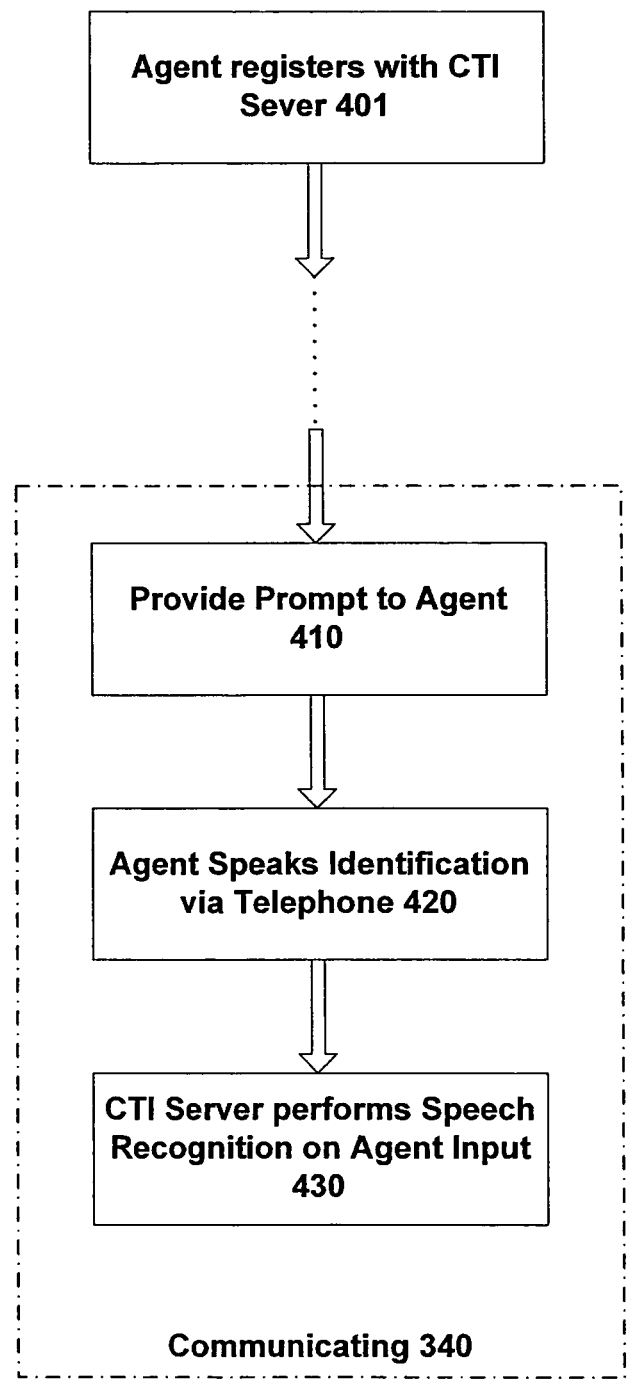
FIG. 4A is a flowchart illustrating a detail from the method of FIG. 3 in accordance with another embodiment of the invention.

FIG. 4A illustrates another embodiment of the invention in which voice analytics system 93 is used in the communications between an agent 120 and the CTI server 80 to identify the agent assigned to the call as per step 340 of FIG. 3. This embodiment again usually involves an initial registration procedure 401, which can be accomplished as described above in relation to FIG. 4. Subsequently, when an incoming call 60 is received, the CTI server 80 provides a prompt 410 over the telephone line to the agent who has received the call from ACD 91. In response to this prompt, the agent speaks into the telephone and provides some form of identification information 421, for example the agent name, telephone extension, or some other reference number such as allocated during the registration procedure (operation 401). The CTI server 80 uses the voice analytics system 93 to perform speech recognition on the spoken input from the agent. This allows the CTI server 80 to identify the agent who is handling the call 431 and also their associated computer workstation based on the previously provided registration information.

In some embodiments, the initial prompt to the agent at operation 410 may be omitted if the agents are trained to always identify themselves upon receipt of an incoming call. A further possibility is that the agent is provided with the prompt via the computer workstation. Since the computer telephony server has not yet identified the receiving agent at the time of the prompt, this workstation prompt would be an automatic part of the script for handling a new call (triggered for example by the agent clicking a button on the screen of the workstation to indicate that he/she has just received a new incoming call).

The speech recognition may be supplemented by speaker recognition from the voice analytics system. This can help to provide a more reliable recognition of the agent, in that the CTI server 80 is able to discern the agent identity both from what is spoken (such as an agent reference number) and also from the voice in which the agent speaks. Alternatively, the CTI server 80 may rely just on speaker recognition to identify the agent.

In some embodiments, the call completion step 360 of FIG. 3 may be delayed until after the voice analytics has completed and the agent identified (or at least until after all the relevant speech input from the agent for the voice analytics has been received). This is analogous to the situation described above in relation to FIG. 4, and avoids the caller hearing speech from the agent which is intended for the computer telephony server to identify the agent and from hearing any audio prompt from the computer telephony server to the agent to request such speech input. In this arrangement, the completion of the voice analytics and the identification of the receiving agent by the computer telephony server can then be used to trigger the computer telephony system to complete the call between the caller and the agent.

Alternatively, the voice analytics may be performed while the call is in progress—i.e. after the call completion step 360 of FIG. 3. In this embodiment, the voice analytics system in effect eavesdrops on the ongoing call between the agent and the caller in order to identify the agent on the basis of his or her voice (i.e. speaker recognition). Speech recognition can also be used to identify the agent if all agents are trained (or prompted by the script running on their workstation) to speak their name to the caller at the start of the call, for example as part of introducing themselves to the caller. In such circumstances, the speech recognition could be employed instead of or in conjunction with speaker recognition. Note that in this embodiment, the CTI server may continue to bridge the call for as long as the voice analytics remains active. This allows for reliable separation of speech from the agent compared with speech from the caller, and hence simplifies the task of the voice analytics system.

Listening-in to an ongoing call by the voice analytics system avoids the caller having to wait until the CTI server has identified the agent before connection with the agent, thereby helping to reduce the delay experienced by the caller. On the other hand, such an approach may restrict call handling options for the agent at the start of the call, since the CTI server can only provide specific CTI information to the agent after there has been sufficient conversation for the voice analytics to identify the relevant agent participating in the call. In other words, the initial call handling script must be generic for all calls until the CTI information becomes available to the agent.

The use of voice analytics by the computer telephony server to identify the receiving agent may be supplemented by other information available to the computer telephony server. For example, a receiving agent may be instructed to click on his/her workstation each time a new call is received, this click then producing a notification to the computer telephony server. If the rate of incoming calls is relatively low, then the computer telephony server may be able to match the workstation with the call based on timing alone (since the computer telephony server has both the telephone call timing and the workstation timing). Note that such an identification does not require any prior registration of telephone against workstation, since the CTI server is able to map the telephone call directly to the associated computer workstation.

Such an implementation may then use voice analytics when multiple calls are received too close together to be reliably distinguished from the timing alone. This helps to reduce the overall burden on the voice analytics system (since it is only employed with a subset of calls), as well as minimising call delays experienced by the user. Furthermore, if the computer telephony server only has to differentiate between a limited number of agents (i.e. just those agents who have indicated receiving a call within a given time window), this helps the accuracy of the voice analytics, since now there are only relatively few speakers (or spoken identifiers) for the voice analytics to select between.

Note that timing workstation input from the agent on receipt of a new call in order to identify the receiving agent may be supplemented where necessary by other agent identification techniques (apart from speech input from the agent). For example, the procedure discussed above in relation to FIG. 4 may be used to handle situations where the timing of incoming calls is too close to allow reliable resolution between multiple agents.

Figure 5:
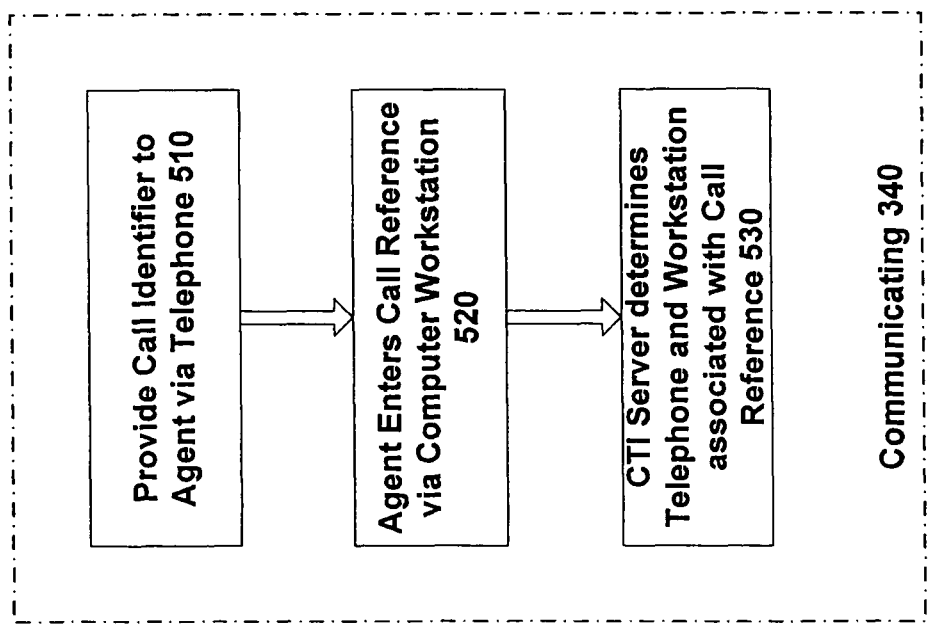
FIG. 5 is a flowchart illustrating a detail from the method of FIG. 3 in accordance with one embodiment of the invention.

FIG. 5 is a diagram illustrating certain aspects of operating the CTI system of FIG. 2 in accordance with one embodiment of the invention. The processing of FIG. 5 corresponds to the communicating operation 340 of FIG. 3. Note that the processing of FIG. 5 does not include a prior registration step (c.f. operation 401 of FIG. 4). However, such a prior registration step may be performed in conjunction with the processing of FIG. 5, if so desired.

The processing of FIG. 5 commences with the CTI server 80 providing an identification of the new call to the receiving agent 510. This information may comprise a reference number for the call. In one embodiment, the reference number is generated by the CTI server 80 sequentially for each incoming call (and may wrap or reset at an appropriate point). In some other embodiments, the reference number may be based on the calling line ID (CLID) for the call, although this may not necessarily be available for all calls. The reference number may comprise only part of the CLID, e.g. the last four digits.

In one embodiment, the CTI server provides the call reference number to the agent by sending an audio signal over the telephone network 101, e.g. using IVR 95. It will be appreciated that in this embodiment, the call reference number can be selected as any desired number. Another possibility is that the agent telephone includes a small screen for automatically displaying the CUD of incoming calls. In this case, the call reference number may comprise all or part of the CUD of the call.

Note that it is sometimes possible for the CTI server 80 to inject specific data into the CLID field for a call (subject to certain regulatory requirements), rather than simply forwarding the CUD from the incoming call 60. This would then provide the CTI server 80 with more flexibility in terms of what is used as the call reference number supplied to the telephone screen. The injected data could replace, modify, or supplement the original CUD. One possibility is that an identifier (say 2 or 3 digits) is appended to the original CUD to form a composite reference number.

The agent now provides the call reference number to the CTI server 80 using his/her workstation 122. This can be accomplished by providing the agent with a screen in which to enter the call reference number, and the input information is then transmitted to the CTI server 520. This allows the CTI server to link the relevant CTI data to the call 530. In particular, the CTI server knows which CRM or other data is linked to a given telephone call—i.e. a call having a certain call reference. In addition, the CTI server knows which workstation is used by the agent handling the call, since the call reference for that call will have been sent back from that computer workstation at operation 520. Accordingly, the CTI server can supply the CTI data associated with the call (e.g. as obtained from CRM database 70) to the workstation 122 for the agent who has received the call.

Figure 6:
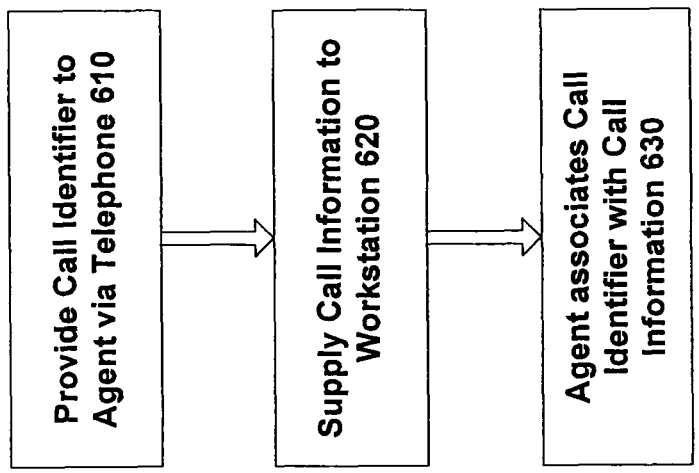
FIG. 6 is a flowchart illustrating a portion of the method of FIG. 3 in more detail in accordance with one embodiment of the invention.

FIG. 6 is a diagram illustrating certain aspects of operating the CTI system of FIG. 2 in accordance with one embodiment of the invention. The processing of FIG. 6 corresponds generally to the operations 340 and 350 of FIG. 3 (communicating between the agent and the CTI server and sending the CTI information to the agent). Note that the processing of FIG. 6 does not include a prior registration step (c.f. operation 401 of FIG. 4). However, such a prior registration step may be performed in conjunction with the processing of FIG. 6, if so desired.

The processing of FIG. 6 starts with using the telephone network 101 to provide a call identifier to the receiving agent 610. This operation corresponds to operation 510 in the processing of FIG. 5, and accordingly may be implemented in the same manner as described above with reference to FIG. 5.

The CTI server also provides call information about the call to at least one computer workstation over computer network 620. This call information may have been retrieved from or reference CRM database 70, as previously described. Note that at this stage, the CTI server 80 is not aware of which workstation (or telephone extension) is handling the new call. The call information is therefore provided or made available to all of the workstations 122. In addition, the CTI server 80 is likely to handle a series of calls, so that a sequence of call information may be produced corresponding to the various incoming calls.

Table 1 provides an example of a listing of calls being handled by the computer-telephony system (older completed calls are omitted). It will be appreciated that this is provided by way of illustration only, and other embodiments may provide less information, additional information or different information. Further, other embodiments may provide the data in a very different format from that shown in Table 1.

The listing of Table 1 may be pushed out to all workstations, e.g. using screen pops. Another possibility is for an agent to download an updated version of the listing from the CTI server in response to receipt of an incoming call, e.g. by clicking on a web link. The CTI server is responsible for maintaining and updating the information in Table 1.

| Call ID | CLID | Time | Call Status | Agent Assigned | Data Link |
| --- | --- | --- | --- | --- | --- |
| 377 | 845678 | 14:59:06 | Queuing | | |
| 376 | 774418 | 14:58:46 | Allocating | | Link376 |
| 375 | NA | 14:58:33 | Allocating | | Link375 |
| 374 | 444569 | 14:58:10 | Connected | A17 | Link374 |
| 373 | 243139 | 14:58:01 | Connected | A13 | Link373 |
| 372 | 345009 | 14:57:49 | Finished | A18 | Link372 |
| 371 | NA | 14:57:41 | Connected | A09 | Link371 |
| 370 | 281764 | 14:57:08 | Connected | A04 | Link370 |
| 369 | 967771 | 14:56:58 | Finished | A15 | Link369 |

The first column of Table 1 provides a call identifier. The CTI server 80 allocates a new call identifier to each incoming call 60. The second column of Table 1 lists the CLID associated with the call (this may not be available for all calls). As previously discussed, the CLID may be replaced, modified or supplemented if so desired by the CTI server. The third column of Table 1 lists the time of receipt of the call into the CTI server. Note that Table 1 is order according to time of receipt (most recent calls being at the top of the listing).

The fourth column of Table 1 lists the status associated with a call. It is assumed that a call is put into a "queuing" status while being initially handled by the CTI server 80 (and IVR 95 if appropriate). The CTI server 80 then directs the call to the customer site (as per operation 320 of FIG. 3), corresponding to the status "allocating". The status "connected" indicates that the agent has been connected to the caller (as per operation 360 of FIG. 3), thereby allowing the agent to actively handle the call. The final status is "finished", when the agent is no longer connected to the caller.

The fifth column of Table 1 indicates the agent assigned to the call. Note that calls with a current status of "queuing" or "allocating" do not yet have an assigned agent. The final column of Table 1 provides a link to further information, e.g. CRM data, associated with the call. An agent can click on the relevant link for a call that they have received to obtain this further information to help with the call handling.

The agent uses the call identifier received via the telephone (at operation 610) to select an appropriate call from a call information screen as provided on the computer workstation (at operation 620) 630. The call information screen may correspond to the listing of Table 1. For example, an agent receiving a call on the telephone may hear a call identifier "376". The agent finds call identifier 376 in the on-screen call information, as per the second row of Table 1 (ignoring headers). The agent can then click on the link associated with call identifier 376 to download additional information associated with this call for use in further handling of the call. Another possibility is that the agent matches the CLID displayed on their telephone with the CLID presented in the second column of Table 1. Note that in this configuration the final column of call identifiers may be omitted, since the CLID itself can serve as the call identifier and may be made to link through to additional information about the call.

In some embodiments, the link in the final column of Table 1 (or potentially in the CLID column) may connect directly to CRM database 70 or other appropriate information source. In such an arrangement, the CTI server 80 does not necessarily ever become aware of which agent is handling any given call (and so could not complete the Agent column, i.e. the fifth column, of Table 1). However, in other embodiments, the link may return first to the CTI server 80, and then be redirected from there to the CRM database 70 or other specified information source. This allows the CTI server 80 to determine which workstation is handling a given call. In particular, the requested link allows the CTI server 80 to identify the call, and the origin of the request allows the CTI server to identify the requesting workstation (and from there, the assigned agent, subject to a prior registration procedure).

Note that in some implementations, especially those designed for handling low call volumes, it may be possible to omit operation 610 from the processing of FIG. 6 (and also to make corresponding modifications to operation 630). In this approach, it is assumed in effect that the calls are reasonably spaced apart in time. This allows an agent to identify an incoming call from a listing such as shown in Table 1 without needing a specific call reference. Such an identification might be made, for example, by looking at the time of the call and/or on the basis that only one call is likely to have the status of "allocating" at any given time. Once the receiving agent has identified the link corresponding to the incoming call, the user can then select the link to access information about the call as described above.

The procedures of FIGS. 3-6 link an agent to a particular call in order to provide the agent with CTI information about the call. However, the approach described here may also be used more generally in CTI applications to provide a linkage between:
(1) information concerning the particular telephone call; and
(2) information concerning the agent and workstation involved in the call.
(Such a linkage is of course well-known for CTI applications in a CPE environment, but has frequently not been available for corresponding applications in an SPE environment).

The information related to the telephone call may include, for example, the dialed number and CUD, call timing information, call recording, IVR acquired data and/or application flow, voice analytics (such as speech recognition, speaker identification and/or verification, etc), plus any further data retrievable on the basis of such information, such as from CRM database 70. The telephone call information may be acquired directly by CTI server 80, or may involve the use of ancillary equipment, such as IVR 95, a call recording system (not shown in FIG. 2), or voice analytics system 93.

Information related to the agent and the workstation 122 may include, for example, the identity of the agent, the path followed through an application script on workstation, and/or any data entered by the agent into the workstation.

There are many CTI applications that can benefit from a linkage between telephone call information and the agent and/or workstation involved in the call, including:
a) providing to the agent workstation data retrieved using information relating to the telephone call. This information can then be used in further handling of the call (this is the application illustrated in FIGS. 2-4)
b) correlating telephone call statistics with agent performance. For example, it may be found that an agent who has a higher sales rate (as determined by workstation data) may terminate a lot of calls very quickly (as determined by corresponding telephone call data). This might suggest perhaps that such a good agent is quick to identify and discontinue calls with poor prospects of a sell. It might also be found that there is a higher sales rate for calls which have CUD information available. This might suggest that it is worthwhile to use an IVR as a front end to collect caller details if the CLID information is not available for a particular incoming telephone call.
c) associating a workstation transaction with a particular call recording. This then allows the call recording to be accessed if there is a subsequent dispute about the transaction—e.g. if a customer alleges that the price quoted over the telephone does not match the price that was processed through the workstation.
d) associating a workstation transaction with voice analytics. The voice analytics may be performed in real-time during the call (such as by voice analytics system 93), or on a recording after the call has terminated. One option is to use speaker verification to confirm (at least in part) the identity of the caller prior to continuing with a particular transaction (such as revealing account data to the caller). Another option is to use speech recognition to confirm transaction details, such as an address, as provided by the customer over the telephone and entered by the agent into the workstation.

The above examples are illustrative only, and the skilled person will be aware of many further CTI applications which will benefit from acquiring a linkage or correspondence between (1) information concerning a particular telephone call, and (2) information concerning the agent and workstation involved in the telephone call.

The skilled person will be aware of a range of possible modifications of the various embodiments described above. For example, in the described embodiments, signalling by an agent over the telephone network is performed using DTMF keys, but any other suitable form of signalling over the telephone network may be used instead of DTMF (including, for example, spoken input which is then subject to speech recognition, such as by IVR 95). Furthermore, while various methods have been described for communicating between the CTI server and the agent telephone and workstation to allow the relevant CTI information to be made available to the agent, other methods for performing such communications may be employed. Accordingly, the present invention is defined by the appended claims and their equivalents.

The invention claimed is:

1. A method of handling a telephone call, the method comprising:
   receiving an incoming call at a computer-telephony server located as service provider equipment within a telephone network;
   the computer-telephony server setting up a call to a customer location in response to receipt of said incoming call, said customer location having a plurality of agents, each agent having an associated computer workstation and telephone extension;
   forwarding the call at the customer location to the telephone extension of a receiving agent selected from said plurality of agents, wherein the computer-telephony server is not immediately informed of the agent who receives the call; and
   communicating between the computer-telephony server and one or more of said plurality of agents to allow the computer-telephony server to identify the receiving agent.

2. The method of claim 1, further comprising the agent registering with the computer-telephony server prior to receiving said call.

3. The method of claim 2, wherein said registering allows the computer-telephony server to determine which computer workstation is associated with which telephone extension, wherein said registering further records an agent identifier for the agent associated with a given telephone extension and computer workstation.

4. The method of claim 1, wherein said communicating comprises the receiving agent sending a reference number to the computer-telephony server over the telephone network, wherein said reference number identifies the telephone extension of the receiving agent, or the computer workstation of the receiving agent.

5. The method of claim 4, wherein said reference number is entered via pressing a single programmable key on the telephone.

6. The method of claim 1, further comprising providing a call identifier to the receiving agent over the telephone network.

7. The method of claim 6, wherein said call identifier is played to the receiving agent over the telephone network.

8. The method of claim 7, wherein said call identifier is inaudible to the caller.

9. The method of claim 6, wherein said call identifier is supplied to a screen of a telephone associated with the receiving agent.

10. The method of claim 6, wherein said call identifier is based at least in part on the calling line identification (CUD).

11. The method of claim 6, further comprising the receiving agent transmitting the call identifier to the computer-telephony server using the workstation associated with the receiving agent, thereby allowing the computer-telephony server to associate the call specified by the call identifier with the computer workstation that transmitted the call identifier.

12. The method of claim 6, further comprising the computer-telephony server supplying the workstation associated with the receiving agent with a call listing, said listing comprising at least all calls currently undergoing agent allocation.

13. The method of claim 1, wherein the computer telephony server uses voice analytics on speech input from the receiving agent to identify the receiving agent.

14. The method of claim 13, wherein said voice analytics comprises speaker recognition performed on said speech input.

15. The method of claim 13, wherein said voice analytics comprises speech recognition performed on said speech input.

16. The method of claim 13, wherein the agent receives a prompt to provide said speech input.

17. The method of claim 13, wherein the speech input is received after connecting the caller to the agent by eavesdropping on the conversation between the caller and the agent.

18. The method of claim 1, wherein the call is forwarded at the customer location to the telephone extension of a receiving agent selected from said plurality of agents using an automatic call distribution unit.

19. An apparatus for handling telephone calls, the apparatus comprising a computer-telephony server for use as service provider equipment within a telephone network for receiving an incoming call and for setting up a call from the computer-telephony server to a customer location, said customer location having a plurality of agents, each agent having an associated computer workstation and telephone extension, said call being forwarded at the customer location to the telephone extension of a receiving agent selected from said plurality of agents, wherein the computer-telephony server is not immediately informed of the agent who receives the call;

the computer-telephony server being operable to communicate with one or more of said plurality of agents to allow the computer-telephony server to identify the receiving agent.

20. A non-transitory computer-readable storage medium storing program code that, when executed by a processor, implements a method of handling a telephone call, the method comprising:

receiving an incoming call at a computer-telephony server located as service provider equipment within a telephone network;

setting up a call from the computer-telephony server to a customer location in response to receipt of said incoming call, said customer location having a plurality of agents, each agent having an associated computer workstation and telephone extension;

forwarding the call at the customer location to the telephone extension of a receiving agent selected from said plurality of agents, wherein the computer-telephony server is not immediately informed of the agent who receives the call; and communicating between the computer-telephony server and one or more of said plurality of agents to allow the computer-telephony server to identify the receiving agent.

* * * * *